United States Patent [19]
Mednikow

[11] 3,776,166
[45] Dec. 4, 1973

[54] AIRCRAFT-LANDING STRIP DEVICE
[76] Inventor: Leon Mednikow, 290 9th Ave., New York, N.Y. 10001
[22] Filed: Nov. 23, 1971
[21] Appl. No.: 201,338

Related U.S. Application Data
[63] Continuation-in-part of Ser. No. 158,893, July 1, 1971.

[52] U.S. Cl. ............................ 114/43.5, 114/.5 D
[51] Int. Cl. ......................................... B63b 35/50
[58] Field of Search ............... 114/43.5, .5 D, .5 F; 244/114 R, 110 E; 61/46.5

[56] References Cited
UNITED STATES PATENTS

| | | | |
|---|---|---|---|
| 3,673,973 | 7/1972 | Glaster | 114/43.5 |
| 3,605,669 | 9/1971 | Yu | 114/.5 D |
| 2,972,973 | 2/1961 | Thearle | 114/43.5 |
| 2,107,886 | 2/1938 | Creed | 114/43.5 |
| 1,892,125 | 12/1932 | Armstrong | 114/43.5 |
| 1,478,747 | 12/1923 | Kingoun | 244/110 E |
| 3,544,044 | 12/1970 | Stahmer | 244/114 R |
| R15,758 | 2/1924 | Gibbons | 244/110 E |
| 2,522,667 | 9/1950 | DeLand | 244/114 R |
| 1,824,346 | 9/1931 | Harison | 244/110 E |
| 3,241,324 | 3/1966 | Storm et al. | 61/46.5 |
| 2,238,974 | 4/1941 | Creed | 114/43.5 |
| 1,341,677 | 6/1920 | Roberts | 114/43.5 |
| 1,511,153 | 10/1924 | Armstrong | 114/43.5 |
| 1,813,986 | 7/1931 | Breeze | 114/43.5 |

FOREIGN PATENTS OR APPLICATIONS

| | | | |
|---|---|---|---|
| 243,982 | 7/1960 | Australia | 244/114 R |
| 1,164,245 | 2/1964 | Germany | 244/114 R |
| 1,263,980 | 5/1961 | France | 244/114 R |

OTHER PUBLICATIONS

"Science and Invention," October 1927, Page 495

*Primary Examiner*—Duane A. Reger
*Assistant Examiner*—Galen L. Barefoot
*Attorney*—Laforest S. Saulsbury et al.

[57] ABSTRACT

A floating landing strip of miniature size having floating supporting legs of a shape and spaced sufficiently from one another to withstand violent ocean currents, with the supporting legs long enough to impart buoyancy to the entire structure while concurrently including a large amount of water in the base of the legs imparting stability to the entire structure even during violent storms, the upper pier structure including a turntable air-strip having a series of aligned variable speed surfaces for facilitating take-off and landings of aircraft, together with series of blowers and a series of baffles aligned along the series of variable speed airstrip surfaces such that the blowers and baffles are produceable of air currents further facilitatable of take-off and landings of air craft by directing the air current in the path and/or against lift surfaces of the aircraft, such as an airplane particularly of the jet plane variety.

5 Claims, 3 Drawing Figures

AIRCRAFT-LANDING STRIP DEVICE

This invention is an improvement of and a continuation-in-part of the parent application, U.S. Ser. No. 158,893, filed July 1, 1971, entitled AIRCRAFT-LANDING STRIP DEVICE.

This parent application is hereby incorporated by reference in its entirety, describing an invention relating to means for reducing the necessary length of an airstrip necessary for landing and/or take-off high speed aircraft in particular, and also eliminating the necessity of extended runways in more than a single direction, there being a series of consecutive moving surfaces of variable speeds and during any particular take-off and/or landing the speed of any particular belt and/or of different belts or rollers of the series thereof vary in their rates of speed such that when, for example braking wheels of an aircraft during a landing touch-down the landing surface belts, chains, or the like are actually preferably about stationary or moving only slightly in a direction opposite to that of the approaching aircraft but rapidly begin increasing in intensity and/or the next adjacent belt of the series is of increased rate of speed of movement toward the approaching aircraft, additionally there being in combination a series of consecutive blowers and respective baffles for directing air currents from the blowers at predetermined prescribed angles variable from one angle to another during the approach of an aircraft or the take-off of an aircraft.

The present invention utilizes the same revolvable landing field together with its variable speed belts and variable speed and variable directional blowers and baffles, the present invention more particularly being directed to a novel and valuable advance in aircraft technology, making possible a floatable airport miles distant from land.

BACKGROUND

Without the revolvable turntable and variable speed belts and blower-baffles of the parent application, such a floating airport would not be a practical structure and could not be reduced to reality because of the large size of such a floating airfield if the airfield were of conventional construction and size. Also, prior to this invention there has been no adequate means provided nor suggested which would make possible such a structure to have necessary stability nor capable of resisting violent ocean currents.

SUMMARY OF THE INVENTION

An object of this invention is to obtain a floatable landing field by overcoming one and more of prior difficulties and/or problems.

Another object is to obtain a floatable landing field of sufficiently small size to have internal structural stability to resist breaking up when exposed to torques of ocean currents.

Another object is to obtain a floatable airfield having a high level of motion stability.

Another object is to obtain a floatable airfield of a shape and design suitable for receiving and accommodating a plurality of aircraft and of commuter sea vessels for transporting logistic materials and passengers to and from land.

Another object is a floatable airfield of a structure providing storage facilities for aircraft, and/or logistic materials, and/or passengers, and the like.

Other objects become apparent from the preceding and following disclosure.

One or more of the above objects are obtained by the invention as described hereafter.

Broadly the invention is directed to a novel pier and pier support structure in combination with the rotatable turntable-carrying moving-belt landing strips and blower-baffle structures of the parent application, the novel pier structure and support therefor including an upper structure supportable of the landing field mechanisms and the support structure including a plurality of spaced downwardly extending legs preferably of columnar shape providing sufficient hollow space within the respective legs to both include a major amount of water in the bottom portion of the leg spaces as well as having sufficient water tight space above the water in the legs to provide sufficient buoyancy to the overall pier structure to floatably support the pier structure and the leg structures. The water within the base of the respective leg structures is of a quantity sufficient to impart motion stability and resistance to violent ocean currents as well as the effect of winds against the upper pier structure, while the additional hollow leg space above the stabilizing water in each respective leg is of a sufficient amount to impart the necessary buoyancy for floating the entire structure. In preferred embodiments, surrounding the revolvable turntable between at least two of the extended strip surfaces are one or more airplane elevators for lowering and raising airplanes from and to the landing strip from hangar decks below for the storage and/or loading and unloading of airplanes. Additional levels of the pier structure are optional for ticket office floors, baggage and control floors, logistic supplies, and the like. In one or more of the leg structures, at a predetermined level at which water level would normally occur, are one or more ports suitable for embarking and/or disembarking from water vessels such as hydrofoils, boats or the like, for entry into the leg structures for a stairwell and/or elevator to the upper levels of the pier structure. Extending from one or more portions of the upper pier structure and/or one or more of the leg structures are anchors securable to the ocean or sea floor.

By virtue of this ivnention, it is possible safely to land or have take-off large numbers of aircraft considerable distances from land and/or populated areas, thereby providing improved safety to land-based population and businesses as well as avoiding pollution-contamination of air and sound (noise) pollution in populated areas. Additionally the lack of skyscraper buildings, homes, and the like provide improved safety to incoming and outgoing aircraft.

THE FIGURES

DETAILED DESCRIPTION OF THE INVENTION

Figure 1:
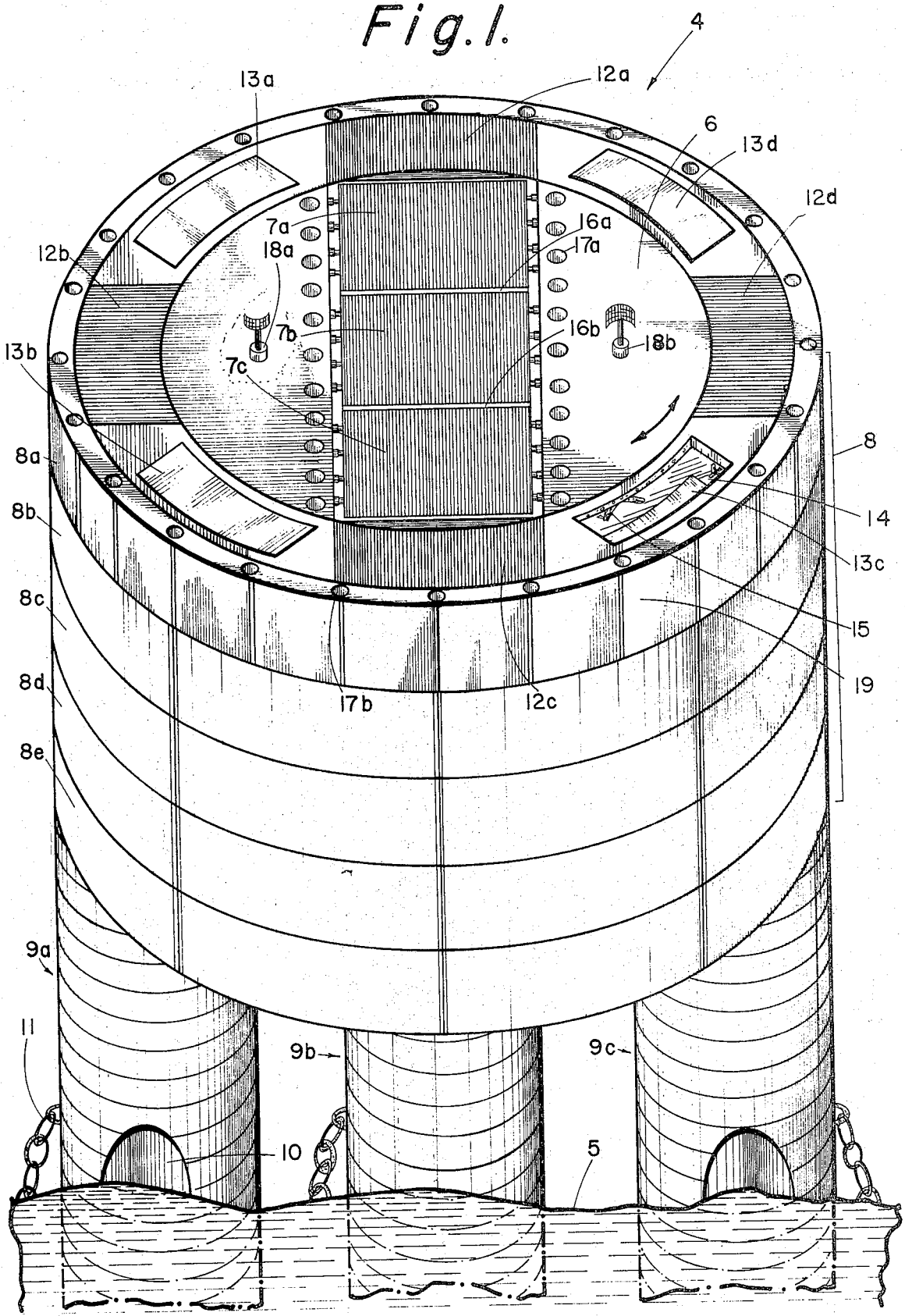
FIG. 1 is a perspective side view of the floating miniaturized landing field of this invention.

FIG. 1 illustrates a perspective view of the floatable airfield structure 4 floating within the ocean waters 5. The structure 4 includes broadly the upper rotatable-turntable air-landing and take-off field 6 with the serially arranged rotary-belt landing field 7a, 7b, and 7c. The upper structure 8 includes a plurality of decks 8a, 8b, 8c, 8d, and 8e, with the upper structure 8 being supported on a plurality of downwardly extending legs 9a, 9b, and 9c spaced apart from one another providing a predetermined large amount of flow space between the legs for the free flowing of sea water 5 in which the respective legs are floating. One or more of the legs includes an entrance 10 for sea-going vessels such as small shuttle craft — typically small boats and/or hydrofoils, or the like. One or more of the legs typically includes an anchoring structure such as anchor chain 11 secured to an anchor (not shown), extending to the ocean floor or the sea bed. The upper face of the upper strucure 8 includes typically the rotary turntable 6 rotatable within a peripheral area including landing field extensions 12a, 12b, and 12c, 12d, and one or more freight and/or airplane hangar elevators 13a, 13b, 13c, and 13d, the elevator 13c being shown in a lowered position thereby providing also a view of the lower hangar deck 14 typically with an aircraft 15 parked thereon. The rotary airfield turntable 6 and the rotary airfield belts 7a, 7b, 7c, for example, as well as the adjustable air baffles 16a and 16b are merely broadly represented since these parts of this invention are the same as disclosed in the parent application Ser. No. 158,893 — the disclosure thereof incorporated by reference above. Similarly, lights 17a and 17b, radar 18a and 18b, electric eyes, and the like are about the same and function the same as disclosed in the parent application. The plurality of decks such as 8a, 8b, 8c, 8d, and 8e provide hangar space for airplanes, passenger space for waiting rooms, ticket offices, clerical offices, and the like, baggage and/or freight compartments, logistic supplies, restaurants, toilet facilites, and the like, as might be desired and/or conventional for any conventional air terminal, except that many air terminal facilities for ticket offices of individual airlines and the like would be located at a main land based facility preferably. Typically any one or more of the decks such as 8a may have transparent walls 19 providing more adequate lighting within the hangar area.

The length of the legs 9a, 9b and 9c, there being possible any number of a plurality of legs as might be found desirable and/or more feasible from an engineering standpoint, are possible, with the provision that however there be a large float space between the respective legs for the flowing of sea water 5. The legs are of hollow structure and to some extent may be utilized for additional storage facilities as well as have siairwells and/or elevators therein for passengers and/or freight being brought in and out of the entrance 10 of the respective legs. It should be noted that it is the extended length of these legs of a hollow water tight character that provides the necessary buoyancy for floating the entire structure, although it is within the scope of the invention for the entire structure 4 to be operated somewhat in the nature of a dry dock which may be settled onto an ocean or sea floor. However less stress on the sea legs and greater overall stability normally would be better obtained with the structure floating above the sea or ocean bottom.

Figure 2:
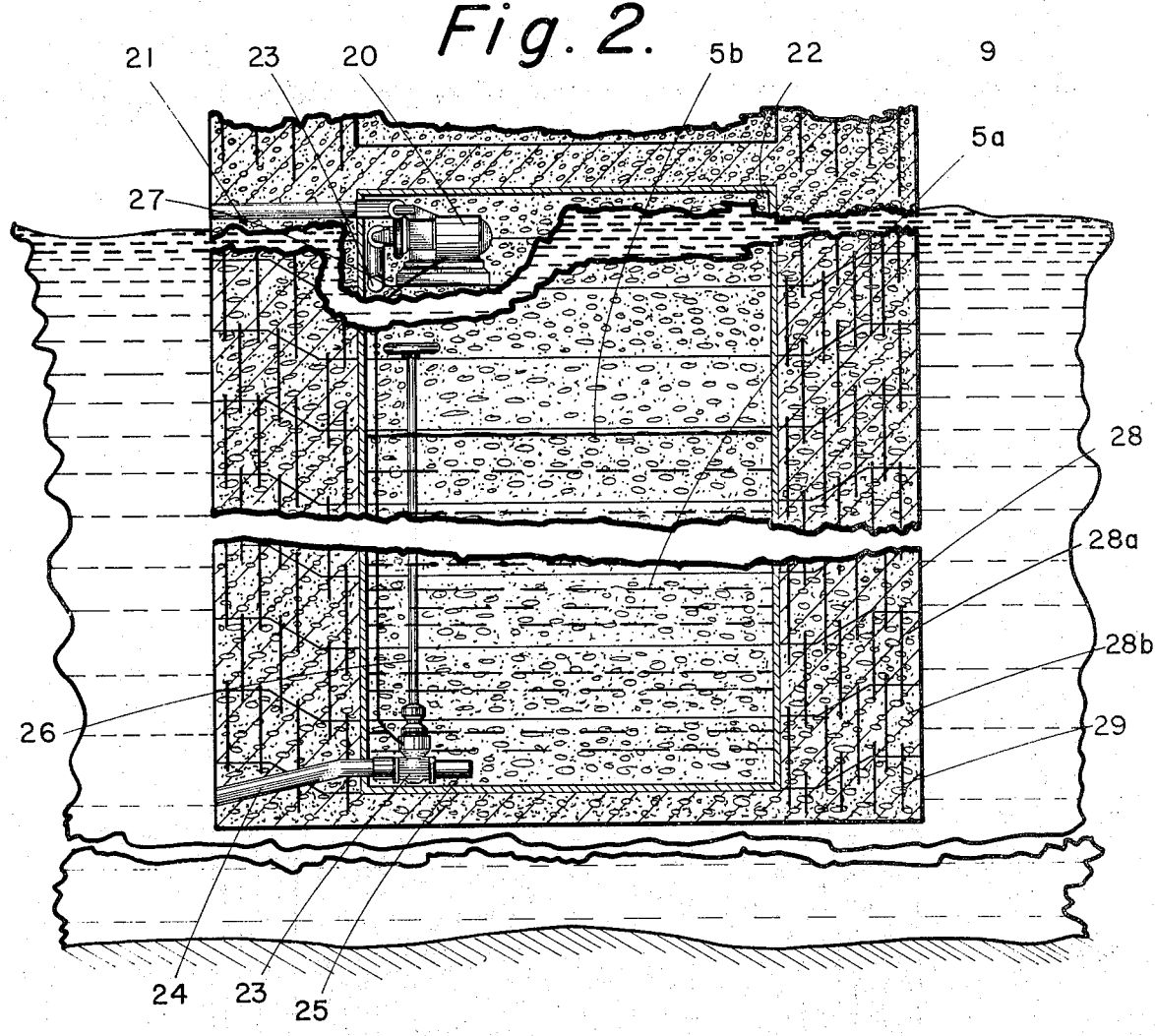
FIG. 2 is an in-part view in cross-section of a floating leg support of the type disclosed in FIG. 1.

FIG. 2 illustrates a cross sectional view shown in part of a typical leg 9 illustrating for example an air pump 20 connected with conduit 21 for pumping in and/or out air within the system preferably within an air-tight compartment 22 for forcing air into under pressure through conduit 23 in order to force out sea water 5a which normally is maintained preferably at a level 5b within the base of the legs in order to offer improved stability to the overall structure. Water is forced out by virture of the valve 23 through conduits 24 and 25 being opened by manual lever 26 or by automatic control lead 27 connected to the air pump 20.

The walls 28 typically include a plurality of precast sections 28a, 28b, etc. reinforced by rods 29 such that construction thereof is facilitated.

Figure 3:
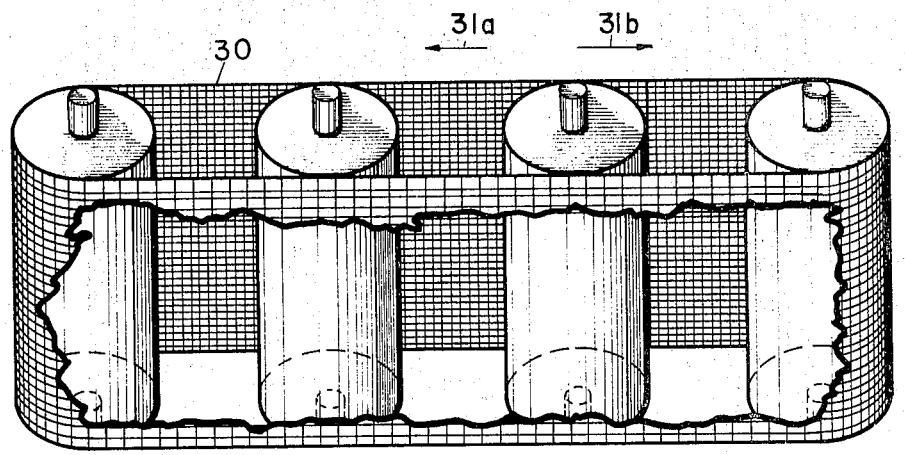
FIG. 3 illustrates a diagrammatic perspective view of a typical steel rotary belt system, illustrating the belt in broken-away view for a better illustrative view of the rotatable cylinders.

FIG. 3 broadly represents a perspective view of a typical belt of the type more fully disclosed in the parent application, of a rotary nature for the landing thereon of aircraft. The mechanical drives, connections, and other engineering data and mechanisms may be of the type disclosed in the parent application and/or of any desired and/or conventional design and mechanism within the skill of the art. Typically the belt 30 is rotatable in either direction 31a or direction 31b at variable speeds, together with the coordinated action of air fans and ducts and flanges broadly represented in FIG. 1 at 16a located typically between consecutive belts but also possibly adjacent separate belts, it being possible to have any one of a variety of belt systems in series and/or in parallel.

Other modifications and/or substitution of equivalent elements of about the same function as would be apparent to a person of ordinary mechanical and engineering skill are within the scope of this invention.

I claim:

1. A floatable airplane landing strip device comprising in combination: an upper pier structure having extending downwardly therefrom a plurality of leg-structure means spaced apart from one another and substantially free of interconnecting brace and buoyant structure between downwardly extending portions of said leg-structure means, providing for major substantially uninhibited flow of sea water therebetween through space free of interconnecting brace and buoyant structure between the downwardly extending leg-structure means, each leg-structure means consisting essentially of a hollow structure having pump means for pumping air into and out of the hollow structure and being substantially air-tight and including valve means for securing air-tightness and water-tightness of the hollow structure when the pump means is not in operation, and said each leg-structure means being of a predetermined major cross-section and extending downwardly a major predetermined distance sufficiently for each leg-structure means to constitute a principal buoyant member, said plurality of leg-structure means jointly being the primary buoyancy support of said upper pier structure; the pier structure including an upper surface airplane landing strip device comprising a central substantially horizontal revolvable turntable means of substantial diameter along an upper disk-shaped surface thereof, a plurality of landing strips diverging radially from said central turntable means, an upper face of said central turntable means including in series a plurality of adjacent belts and revolving means therefor providing a series of consecutive landing strips arranged end-to-end one behind the other in the linear course of the landing strip surface extending across said central turntable means, speed means for independent and variable-rate of movement of each of said series of belts within predetermined ranges of speed, and revolving means for intermittently revolving said central turntable means such to align said series with one or more of said diverging landing stips; and including anchoring means.

2. The floatable airplane landing strip device of claim 1, including at least one passenger receiving port at a predetermined normal water level location in at least one of said leg structures, receivable of a sea vessel floating on water adjacent the port.

3. The floatable airplane landing strip device of claim 1, in which between at least two of the plurality of diverging landing strips at a position adjacent the turntable means is located an airplane elevator for lowering and elevating airplanes from and to respective take-off and landing airstrips utilizing the revolvable turntable means.

4. The floatable airplane landing strip device of claim 1, in which said pier structure includes a plurality of decks structured as airplane hangars, logistic storage areas, and people-accommodating facilities.

5. The floatable airplane landing strip device of claim 1, including at least one passenger receiving port at a predetermined normal water level location in at least one of said leg structures, receivable of a sea vessel floating on water adjacent the port.

* * * * *